United States Patent [19]

Holloway

[11] 4,051,111
[45] Sept. 27, 1977

[54] INJECTION MOLDABLE POLYURETHANES

[75] Inventor: John Ambrose Holloway, Sheffield Lake, Ohio

[73] Assignee: The B. F. Goodrich Company, Akron, Ohio

[21] Appl. No.: 716,195

[22] Filed: Aug. 20, 1976

[51] Int. Cl.$^2$ .................. C08G 18/28; C08G 18/00
[52] U.S. Cl. .................. 260/75 NP; 260/75 NE; 260/77.5 AA; 260/77.5 AN
[58] Field of Search .................. 260/75 NP, 77.5 AN, 260/75 NE, 77.5 AA

[56] References Cited

U.S. PATENT DOCUMENTS

| | | | |
|---|---|---|---|
| 2,953,539 | 9/1960 | Keplinger et al. | 260/31.6 |
| 3,196,026 | 7/1965 | Menard et al. | 106/287 |
| 3,211,701 | 10/1965 | Mueller et al. | 260/75 NP |
| 3,312,666 | 4/1967 | Knipp et al. | 260/75 NE |
| 3,357,954 | 12/1967 | Kirkaldy | 260/75 NP |
| 3,503,932 | 3/1970 | Reuter | 260/75 NP |
| 3,523,101 | 8/1970 | Reuter | 260/47 |
| 3,620,905 | 11/1971 | Ahramjian | 260/75 NP |
| 3,658,756 | 4/1972 | Reuter | 260/75 NP |
| 3,900,446 | 8/1975 | McClung et al. | 260/75 NP |
| 3,931,113 | 1/1976 | Seeger et al. | 260/75 NP |

Primary Examiner—H.S. Cockeram
Attorney, Agent, or Firm—J. Hughes Powell, Jr.

[57] ABSTRACT

Novel polyurethanes particularly useful in forming injection molded articles having a good balance of physical properties including, particularly, greater stiffness, low temperature impact and elevated heat distortion resistance are obtained by reacting hydroxyl-terminated polyesters or polylactones having molecular weights greater than about 2800, a cyclic diisocyanate and an aliphatic diol at decreased reaction temperatures.

4 Claims, No Drawings

INJECTION MOLDABLE POLYURETHANES

BACKGROUND OF THE INVENTION

Thermoplastic polyurethanes are known and for some years small injection molded parts and articles have been made from thermoplastic polyurethanes. Because of the good physical properties of polyurethanes, larger parts and articles are desired which have a sufficient balance of desirable physical properties, particularly including stiffness as well as high and low temperatures resistance for a variety of applications. For example, molded thermoplastic polyurethanes find use in automobile parts, which parts are subjected to temperature extremes requiring that such materials have low temperature impact and elevated temperature resistance. Low temperature impact properties are particularly desirable when a part has been painted, and the high elevated temperature resistance, because of exposure to heat effects from sunlight and the high temperature generated in the engine and by friction. While a number of polyurethanes have been used, generally one or another physical properties has to be sacrificed. With most polyurethanes available, to achieve low temperature impact, the elevated temperature resistance to distortion generally is sacrificed; and to obtain high temperature distortion resistance, the low temperature impact is often sacrificed. Therefore, it is an objective of those skilled in the art to obtain thermoplastic polyurethanes that may be injection molded to form parts and articles weighing several pounds which have the required degree of stiffness and strength, and especially, both low temperature impact and high temperature resistance.

SUMMARY OF THE INVENTION

Improved thermoplastic polyurethanes which are injection molded to form articles weighing several pounds which exhibit significantly improved stiffness, low temperature impact resistance and high heat distortion properties, as well as the necessary balance of other desirable physical properties are obtained by reacting a hydroxylterminated polyester or polylactone having molecular weights in the range of greater than about 2800, more preferably about 3000 to about 5000 and an aliphatic diol used in amounts so that a mixture of the hydroxyl polyether glycol or polyester and diol have a blend molecular weight, determined by hydroxyl analysis, of greater than 450 to about 650, more preferably about 500 to 600, and with an excess of cyclic diisocyanate, reacted whereby the reaction between the reactants is initiated at a temperature greater than about 50° C. and allowed to continue to a temperature less than about 160° C. Large articles can be injection molded from these novel polyurethanes that, even when painted, have excellent low temperature impact.

DETAILED DESCRIPTION

The polyurethanes are readily prepared from a variety of compounds having terminal functional groups reactive with organic diisocyanates. Normally used are hydroxyl-terminated compounds. The hydroxyl-terminated compounds or macroglycols usually have molecular weights greater than about 2800. The macroglycols are hydroxyl-terminated polyesters and polylactones. The hydroxyl polyester macroglycols are linear hydroxyl-terminated polyesters having molecular weights between about 2800 and 5000 and acid numbers usually less than about 10. The polyesters utilized include those prepared by the polyesterification of aliphatic dicarboxylic acids including for example, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylidene radical containing 2 to 8 carbon atoms. The glycols used in the preparation of the polyesters by reaction with the dicarboxylic acids are aliphatic glycols containing 2, preferably greater than 2, as 4 to about 10 carbon atoms such as butanediol, hexamethylene glycol, octamethylene glycol, 2-ethylhexanediol-1,6, neopentyl glycol, and the like. Polyesteramides also are contemplated usually be substitution of a diamine or amino alcohol for at least part of the glycol. Especially outstanding results are obtained with hydroxyl poly(tetramethylene) adipate.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX-R-XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains greater than 2 as 4 to 10 carbon atoms, for example, butanediol-1,4, hexamethylene glycol and the like.

The lactones preferred for preparing the polyesters are epsilon-caprolactones having the general formula

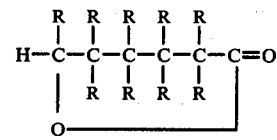

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethylepsilon-caprolactone, γ-methyl-epsilon-caprolactone, β-methylepsiloncaprolactone, dimethyl-epsilon-caprolactone, and the like. The lactones are polymerized readily by heating with the bifunctional reactant to a temperature of about 100° to about 200° C. Catalysts may be employed if desired. Particularly preferred are poly(epsilon-caprolacetone)diols and polyester diols having molecular weights in the range of about 2800 to about 5000.

When polyesters are used havng molecular weights below about 2800, the resulting polyurethanes lack the desired degree of stiffness, having low Vicat values and thus soften readily on heating and are difficulty moldable. The polyesters of molecular weights up to about 5000 are satisfactory and under some conditions may be as high as 7500 in accordance with this invention.

While aliphatic glycols containing 2 to 6 carbon atoms may be used to prepare the polyurethanes, preferably the aliphatic glycol used with the polyesters and poly(lactones) of this invention is butanediol-1,4. In this system using high molecular weight polyesters and poly(lactones), and controlled reaction conditions of less than about 160° C. during reaction, as defined herein, butanediol is unique in providing desirable polyurethanes with an excellent balance of low and high temperature properties, along with other desirable properties, including excellent tear resistance and stress-strain properties.

The amount of aliphatic diol as used may be varied from about 1 to about 10 mols per mol of polyester glycol. Of more utility in the practice of the invention one adds enough glycol to the polyester glycol to provide a blend average molecular weight determined by hydroxyl content of greater than about 450 to about 650, more preferably, from about 500 to about 600. Normally, if the blend molecular weight is less than about 450, the resulting products are too stiff and have poor low temperature impact; and if greater than about 650, the products are too flexible for the desired used.

The organic diisocyanates which are reacted with the macroglycols will include, for example, cyclic, preferably aromatic diisocyanates. Such aliphatic diisocyanates include for example, methylene-bis(4-cyclohexyl isocyanate), isophorone diisocyanate, etc. The aromatic diisocyanates include diphenyl methane-4,4'-diisocyanate, p-phenylene diisocyanate, dichlorodiophenyl methane diisocyanate, dimethyl diphenyl methane diisocyanate, bibenzyl diisocyanate, diphenyl ether diisocyanates, bitolylene diisocyanates, and the like, for example, diisocyanates of the formula

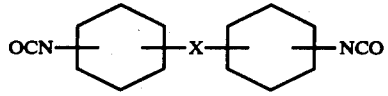

wherein X may be a valence bond, an alkylene radical containing 1 to 5 carbon atoms, NR where R is an alkyl radical, oxygen, sulfur, sulfoxide, sulfone, and the like. Also useful are acyclic or alicyclic diisocyanates containing greater than 6 carbon atoms as 4,4'-methylenebis(cyclohexyl diisocyanate). Preferred is diphenylmethane-4,4'-diisocyanate.

A molar excess of diisocyanate is employed. Based on one mol total of glycol there should be used greater than one mol percent excess of diisocyanate, preferably greater than 1.02 mol, in amounts up to about 4 to 20% excess diisocyanate, as 104 to about 120 mol percent diisocyanate based on the total mols of diols, i.e., 1.04 to 1.1 mol NCO per mol of OH groups. If less than 1.02 mols are used, the resulting products have poor impact and moldability.

An essential feature of the invention is the reaction conditions applied to the reactants. The heat history is important and the reactions must be conducted at a temperature below about 160° C. Normally if one of the reactants is solid it will be heated first to a liquid state and the other liquids added thereto. The reactants thereafter may be heated to a temperature of greater than about 50° C. as 60° C. to about 70° C., the reaction mixture held for a short time, usually only a few seconds, 10 to 60 seconds for example, until the temperature reaches about 70° to about 80° C., at which time it may be transferred into a second reaction zone where the reaction is allowed to continue at a temperature below 160° C., more preferably less than about 150° C. Usually only about 5 to 15 minutes is required for the reaction at this temperature for at least 95% conversion of the reactants to solid polyurethane. The first heatup is probably to less than 90° C. and the second reaction temperature, although it is timetemperature related, under normal operating conditions should be greater than about 100° C., and more preferably, greater than about 120° C. The exotherm is readily maintained below 160° C., preferably 150° C. by controlling the thickness of the reactants coming from the initial heating zone in an ambient condition, or by applying heat or cooling by known engineering methods of heat transfer to control the temperature. If the temperature is allowed to get out of control, as the temperatures of 180° C., 200° C. or higher, the desired physical properties, especially low temperature impact and heat distortion resistance, are not obtained. Further, if the temperature is not allowed to reach greater than 100° C., the reaction is so slow as to be impractical and the desired physical properties are not obtained. Most commercial thermoplastic polyurethanes are now prepared at high temperatures, often at temperatures that melt the polyurethane. It is a feature of this invention that the reaction is conducted at a temperature below the melting point of the resulting polyurethane, and particularly is maintained at temperatures below 160°.C., more preferably controlled at a temperature less than 150° C., and if in stages, below 100° C. in the first stage, more preferably in the range of about 50 to 90° C. to start the reaction. By observing these reaction conditions, one obtains the desired thermoplastic injection moldable polyurethanes having improved stiffness, low temperature impact resistance and resistance to heat distortion, and the required balance of other physical properties; this is not obtained with the known higher temperature polymerized polyurethanes for injection molding, and when not made with the defined product reactants under these reaction conditions.

EXAMPLE I

To demonstrate the criticality of the nature of the polyester, molecular weight and aliphatic diol, a series of polyurethanes were prepared by heating one mol of the polyester having the molecular weight shown in the table, mixed with sufficient aliphatic diol to give a blend molecular weight of 550, which mixture was mixed with 106% p,p'-diphenylmethane diisocyanate, heated initially to about 60° to 80° C. and then to 130° to 150° C. to complete the reaction. The reaction was controlled by discharging the mixed reactants after heating has begun while at low viscosity at about a ½ inch thick layer and maintaining the exotherm temperature between 130° and 150° C., after which the polyurethane is cooled and ground into granules.

The polymers were prepared into test specimens by injection molding into 3 inches × 6 inches × 0.125 inch plaques which were then tested.

Samples of injection molded plaques were painted with an automotive metal paint and tested for cold impact resistance at −20° F. and −40° F. using a weight dropped upon the panels from different heights. The painted panels were considered satisfactory from a cold impact resistance if there was no failure of the paint substrate at the 10 inch drop level.

TABLE I

| Polyol Type | M.W. | Blend M.W. | Chain Ext.[1] | Injection Moldability | Tensile | % Elong. | Shore D | % Comp. Set R.T. | % Comp. Set 70° C. |
|---|---|---|---|---|---|---|---|---|---|
| 1. Polyethylene glycol adipate | 2391 | 550 | B.D. | V. Good | 5600 | 670 | 42 | 18 | 51 |
| 2. Polyethylene glycol adipate | 4049 | " | " | V. Good | 4200 | 630 | 45 | 24 | 48 |
| 3. Polycaprolactone | 2973 | " | " | V. Good | 4300 | 590 | 43 | 22 | 51 |
| 4. Polytetramethylene adipate | 5011 | " | " | V. Good | 5500 | 540 | 43 | 24 | 46 |
| 5. Polytetramethylene adipate | 4098 | " | " | V. Good | 6300 | 600 | 49 | 24 | 47 |
| 6. Polytetramethylene adipate | 3034 | " | " | V. Good | 7000 | 540 | 42 | 17 | 51 |
| 7. Polytetramethylene adipate | 2680 | " | " | Poor | 7000 | 630 | 46 | 18 | 61 |
| 8. Polytetramethylene adipate | 878 | " | " | Poor | 7700 | 560 | 41 | 17 | 68 |
| 9. Polycaprolactone | 2973 | " | " | V. Good | 6300 | 585 | 46 | 14 | 50 |
| 10. Polytetramethylene adipate | 2080 | " | H.D. | Poor | 5000 | 690 | 43 | 23 | 79 |
| 11. Polytetramethylene adipate | 2080 | " | E.G. | Fair | 2200 | 500 | 36 | 36 | 77 |
| 12. Polytetramethylene adipate | 4098 | " | " | V. Good | 3600 | 575 | 52 | 53 | 67 |

| Polyol Type | Tensile Set (%) | Graves Tears (psi) | Vicat (° C.) | Stiffness (psi, 10³) -20° F. | Stiffness R.T. | Stiffness 160° F. | % Pass 24" Drop Cold Impact -20° F. | % Pass 24" Drop Cold Impact -40° F. | Not Painted -40° F. | 250° F. Oven Sag (mm) |
|---|---|---|---|---|---|---|---|---|---|---|
| 1. Polyethylene glycol adipate | 66 | 785 | 145 | 99.1 | 7.4 | 4.37 | 0 | — | 0 | 17 |
| 2. Polyethylene glycol adipate | 98 | 800 | 140 | 82.5 | 10.4 | 5.35 | 0 | — | — | 10 |
| 3. Polycaprolactone | 62 | 700 | 158 | 59.2 | 8.2 | 6.29 | 100 | 0 | 100 | 12 |
| 4. Polytetramethylene adipate | 84 | 790 | 159 | 60.4 | 9.3 | 5.73 | 80 | 0 | 100 | 9 |
| 5. Polytetramethylene adipate | 80 | 800 | 155 | 59.8 | 9.3 | 5.34 | 100 | 0 | 100 | 10 |
| 6. Polytetramethylene adipate | 56 | 715 | 140 | 36.9 | 6.3 | 4.21 | 100 | 0 | 100 | 20 |
| 7. Polytetramethylene adipate | 40 | 690 | 107 | 36.0 | 5.6 | 3.02 | 0 | — | 100 | 22 |
| 8. Polytetramethylene adipate | 22 | 565 | 79 | 81.6 | 4.3 | 1.97 | 0 | — | 100 | 81 |
| 9. Polycaprolactone | 22 | 640 | 128 | 25.8 | 5.4 | 3.40 | 100 | 0 | 100 | 25 |
| 10. Polytetramethylene adipate | 45 | 600 | 74 | 40.6 | 5.3 | 2.40 | 0 | — | 50 | — |
| 11. Polytetramethylene adipate | 95 | 545 | 70 | 30.0 | 4.9 | 2.70 | 0 | — | 0 | 59 |
| 12. Polytetramethylene adipate | 131 | 815 | 96 | 95.5 | 22.2 | 3.50 | 0 | — | 100 | 39 |

[1]Chain Extender abbreviations:
B.D. = 1-4 Butanediol
H.D. = 1-6 Hexanediol
E.G. = Ethylene Glycol

EXAMPLE II

As another demonstration of the unexpected advantages obtained from the polymers and process of this invention may be seen by comparing the physical properties of another polymer of poly(tetramethylene adipate) molecular weight 3100, 1,4-butanediol added for a blend molecular weight of 555, reacted initially at 60° C. and allowed to react at a temperature no greater than 135° C., compared with a poly(tetramethylene adipate) of 3100 molecular weight having butanediol-1,4 added for a blend molecular weight of 470 reacted at a temperature of 220° C. 0.75 phr of an amide processing wax was added to both polymers for processability. Samples of the polymers were injection molded in 3 inches × 6 inches × 0.125 inch molds at low and high temperatures. Physical properties were determined on the molded samples. A significant loss of properties critical to many article applications occurs in polymers made at the higher reaction temperatures, such as Vicat, heat distortion, elevated temperature stiffness and low temperature flux impact. However, the polymers of this invention made at 135° C. had higher Vicat heat distortion and better low temperature impact, than the control under two different molding conditions. This polymer also demonstrated better low temperature and elevated temperature performance; having a 40° C. higher Vicat heat distortion with at least a 20° F. improvement in low temperature flex impact as compared to the polymer prepared at 220° C.

EXAMPLE III

To further demonstrate the practice of the invention and the criticality of the features thereof, a number of other preparations and the properties of the resulting polyurethanes are reported herein. All of the polymers were prepared by heating hydroxyl poly(tetramethylene) adipate of the molecular weight set forth in the tables, butanediol-1,4 in amounts to provide the blend molecular weight set forth in the tables, and 103.5% p,p'-diphenylmethane diisocyanate, to a temperature of 60 to 70° C. for about 10 to 15 seconds and the reaction mixture discharged from this first zone while at low viscosity at a temperature of 70° to 80° C. in ½ inch thickness layer, which retained an exotherm temperature of 130° to 140° C. for about 5 to 10 minutes, after which the polyurethane hardened and is ground into granules for injection molding. The polymers were tested as described in Example I.

TABLE II

| Sample | Polyol Type | Polyol Mols | Polyol M.W. | Chain Extender | Mols | Blend Mol. Wt. | % DI | Mols | Tensile (psi) | % Elong. | 300% Mod. | Hardness Shore "D" |
|---|---|---|---|---|---|---|---|---|---|---|---|---|
| 1 | PTA[1] | .597 | 2680 | Butanediol | 3.08 | 510 | 103.5 | 3.81 | 8000 | 550 | 2800 | — |
| 2 | " | " | " | " | 2.76 | 550 | " | 3.48 | 5800 | 430 | 2800 | 44 |
| 3 | " | " | " | " | 2.43 | 600 | " | 3.14 | 6300 | 485 | 2350 | 42 |
| 4 | " | " | " | " | 2.16 | 650 | " | 2.85 | 7000 | 550 | 2250 | 39 |
| 5 | " | .516 | 3102 | " | 3.18 | 510 | " | 3.85 | 6500 | 550 | 2850 | 43 |
| 6 | " | " | " | " | 2.86 | 550 | " | 3.51 | 5800 | 515 | 2700 | 47 |
| 7 | " | " | " | " | 2.53 | 600 | " | 3.16 | 5100 | 510 | 2700 | 45 |
| 8 | " | " | " | " | 2.26 | 650 | " | 2.88 | 5500 | 570 | 2250 | 43 |
| 9 | " | .426 | 3521 | " | 3.05 | 510 | " | 3.60 | 5100 | 645 | 2500 | 46 |
| 10 | " | " | " | " | 2.75 | 550 | " | 3.29 | 5450 | 645 | 2400 | 48 |
| 11 | " | " | " | " | 2.44 | 600 | " | 2.97 | 4600 | 675 | 2300 | 44 |
| 12 | " | " | " | " | 2.18 | 650 | " | 2.70 | 4700 | 685 | 2200 | 44 |

| Sample | Compression Set (%) RT 22 Hrs. | Compression Set (%) 70° C. 22 Hrs. | Annealed 24 Hrs. at 100° C. Compression Set RT 22 Hrs. | Annealed 24 Hrs. at 100° C. Compression Set 70° C. 22 Hrs. | Graves Tear (psi) | Vicat Softening Point (° C.) | Stiffness (psi) RT | Stiffness (psi) 160° F. | Stiffness (psi) −20° F. |
|---|---|---|---|---|---|---|---|---|---|
| 1 | 14.8 | 43.8 | 15.2 | 27.6 | 725 | 122 | 7650 | 4785 | 50110 |
| 2 | 14.1 | 47.7 | 14.3 | 26.6 | 690 | 119 | 5824 | 4000 | 37130 |
| 3 | 13.0 | 45.6 | 13.9 | 25.6 | 640 | 115 | 4870 | 3480 | 28180 |
| 4 | 13.0 | 42.8 | 13.4 | 24.4 | 610 | 105 | 3820 | 2910 | 21840 |
| 5 | 15.1 | 50.0 | 12.5 | 30.0 | 730 | 163 | 11100 | 6400 | 64420 |
| 6 | 13.7 | 50.4 | 13.6 | 30.0 | 720 | 153 | 9100 | 6400 | 52900 |
| 7 | 21.6 | 47.7 | 20.4 | 28.7 | 715 | 147 | 7020 | 5054 | 47580 |
| 8 | 47.1 | 43.4 | 29.6 | 27.7 | 685 | 138 | 5980 | 4120 | 52260 |
| 9 | 40.0 | 46.8 | 39.8 | 37.6 | 850 | 160 | 15090 | 9408 | 102300 |
| 10 | 35.5 | 44.6 | 45.1 | 34.7 | 800 | 158 | 11830 | 7921 | 98280 |
| 11 | 45.7 | 45.2 | 47.3 | 36.4 | 775 | 139 | 9510 | 6247 | 93990 |
| 12 | 42.3 | 45.8 | 45.4 | 35.0 | 750 | 130 | 10120 | 5128 | 89390 |

[1] polytetramethylene adipate

Particular comparisons are to be made with polyurethanes of varying molecular weight. The polyurethanes made with the 2680 molecular weight polyester had low softening points and poor stiffness at 160° F. The poly(tetramethylene) adipate of molecular weight 3521 had acceptable softening point and stiffness properties. Other examples made with 106% MDI showed no essential difference between 103% and 106%. Polyurethanes made with the poly(ethylene) adipate polyesters have very poor cold impact resistance.

These improved polyurethanes are different from known polyurethanes in not only having a crystalline structure but have been found to contain spherulites. Further, these materials, in contrast to most high molecular weight materials, have a relatively sharp melting point which is important both in structure and injection molding and in retention of physical properties of a wide temperature range.

As has been stated, the improved and novel polyurethanes prepared in accordance with this invention have unique and valuable physical properties making them particularly valuable for injection molding articles for use, for example, in transportaton in automobiles, buses, and the like, which balance of physical properties include good injection moldability, high tensile strength, good compression set, high Graves tear, softening points as measured by Vicat of greater than about 115° C. stiffness at 160° F., preferably greater than about 4000 psi at 250° F., oven sag values of less than 30 mm maximum and good low impact properties particularly, of painted surfaces.

I claim:

1. Polyurethanes having low temperature impact and elevated heat distortion resistance with a Vicat value greater than 115° C., stiffness at 160° F. of greater than 4,000 psi and a 250° oven sag of less than 50 mm, prepared by reacting a hydroxyl-terminated polyester or polylactone macroglycol having a molecular weight greater than 2800 to about 8000, an aliphatic diol containing 2 to 6 carbon atoms present in amount so that the average hydroxyl molecular weight of a mixture of the hydroxyl-terminated macroglycol and butanediol is about 450 to less than about 650, and more than a molar equivalent of a cyclic diisocyanate, reacted together at a temperature below 160° C. in two stages, first at a temperature of greater than 50° C. to less than 100° C. and then at less than 160° C. to substantially complete the polyurethane reaction.

2. The polyurethane of claim 1 wherein the macroglycol is a hydroxyl-terminated polyester of aliphatic dicarboxylic acids of the formula HOOC—R—COOH where R is a alkylidene radical containing 2 to 8 carbon atoms, and aliphatic glycols containing greater than 2 and up to 10, carbon atoms, the aliphatic diol is butanediol-1,4, and the cyclic diisocyanate is a dicyclic aromatic diisocyanate present in amounts of greater than about 2 up to about 10% molar excess of the diisocyanate required to react with said polyester and aliphatic glycol and the reaction is conducted initially at a temperature above 60° C. to less than 90° C. and then at a temperature above about 120° C. but less than 150° C. to substantially complete the polyurethane reaction.

3. A polyurethane of claim 2 wherein the polyester is hydroxyl-terminated poly(tetramethylene)adipate having a molecular weight of about 3000 to about 4000, the average molecular weight of the mixture of polyester and aliphatic glycol is from about 500 to about 600, and the aromatic diisocyanate is diphenylmethane-4,4'-diisocyanate present in amount of at least 3 mol percent excess diisocyanate based on the total diols.

4. A polyurethane of claim 3 wherein the molecular weight of the polyester is about 3100 to 3900, the blend molecular weight is about 550 and the amount of diisocyanate used is between about 104 and 110% of the other reactants.

* * * * *

UNITED STATES PATENT AND TRADEMARK OFFICE
CERTIFICATE OF CORRECTION

PATENT NO. : 4,051,111
DATED : Sept. 27, 1977
INVENTOR(S) : JOHN AMBROSE HOLLOWAY It is certified that error appears in the above-identified patent and that said Letters Patent are hereby corrected as shown below:

Claim 1, line 10, delete "butanediol" and insert therefore

--- aliphatic diol --- .

Signed and Sealed this

Twenty-ninth Day of May 1979

[SEAL]

Attest:

RUTH C. MASON
Attesting Officer

DONALD W. BANNER
Commissioner of Patents and Trademarks